Aug. 17, 1965   R. C. GARMAN   3,200,484
AXLE PULLER

Filed April 16, 1962   2 Sheets-Sheet 2

United States Patent Office 3,200,484
Patented Aug. 17, 1965

3,200,484
AXLE PULLER
Robert C. Garman, Penn Township, Lancaster County,
Pa. (Box 25, Penryn, Pa.)
Filed Apr. 16, 1962, Ser. No. 187,807
2 Claims. (Cl. 29—263)

This invention relates to a pulling device and more particularly to a device for removing the rear axle from an automobile and for removing and replacing the bearing on the axle after it has been withdrawn from the housing.

In automobiles manufactured by Chrysler Corporation, the rear axle-bearing-housing assembly is such that the axle cannot be removed for the replacement of the bearing without the exertion of a great amount of force in a direction parallel to the longitudinal axis of the axle. Because of the space limitations it is difficult to get the proper pulling equipment in position to remove the axle from the housing and to press the bearing off of the axle after it has been removed from the housing.

In order to perform the operation of withdrawing the rear axle from cars of this type, the device of this invention has been perfected which fits against the disc on the end of the axle housing and engages the end of the axle itself in such manner that the axle can be withdrawn in a direction parallel to the longitudinal axis of the axle and housing.

An object of this invention is to provide a device which will enable the application of force longitudinally of the rear axle of the car to withdraw the axle from the housing.

Another object of this invention is to provide a device which can be used to press the bearing off of the axle and to press a replacement bearing in position on the axle.

Figure 1:
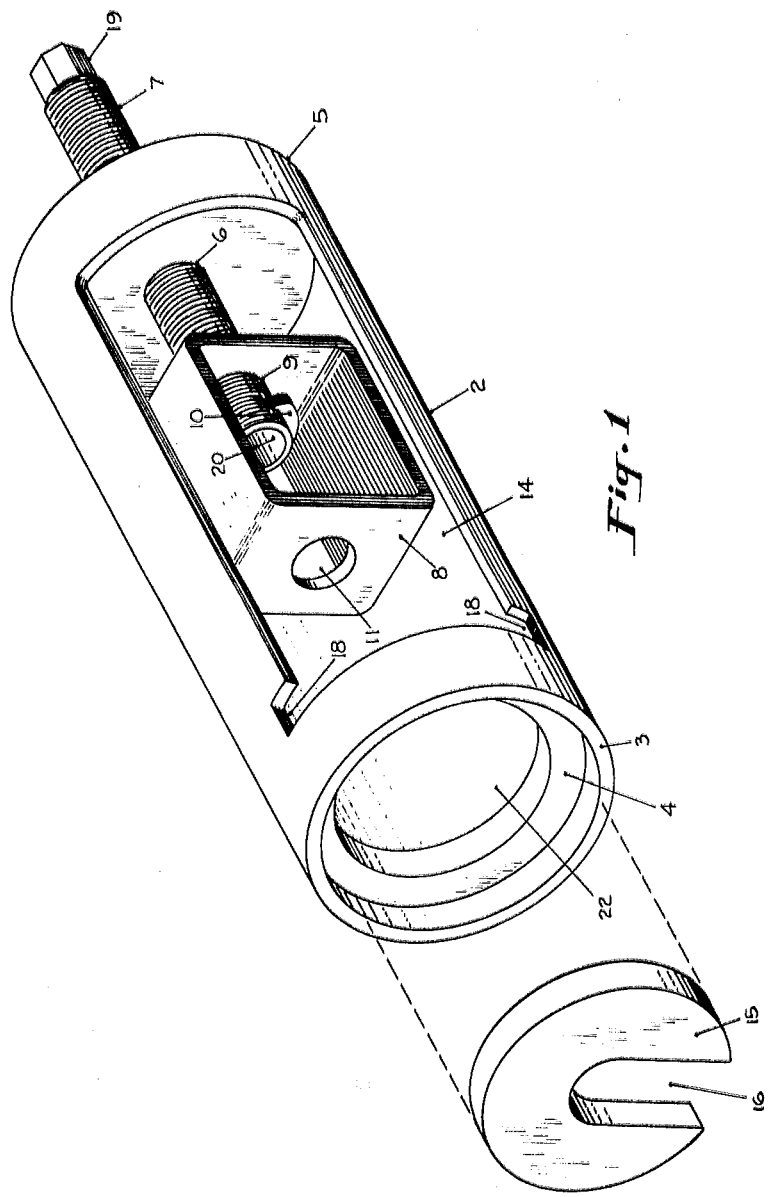
Figures 2, 3:
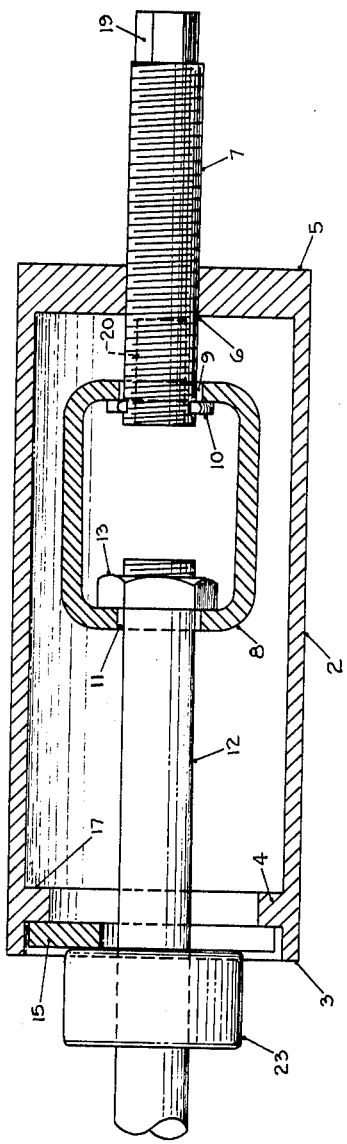

In order that this invention may be more readily understood, it will be described in connection with the attached drawings, in which FIGURE 1 is an isometric view of the device;

FIGURE 2 is a cross-sectional view of the device in position for withdrawing the axle and replacing the bearing; and FIGURE 3 is a cross-sectional view of the device in use removing the bearing from the axle and placing the axle back in the housing.

Referring to FIGURE 1, there is shown a cylindrical member 2 which can be made of a piece of pipe of a diameter approximately the same as the diameter of the housing of an automobile or larger. The end 3 of the cylindrical member 2 is open and is provided with a retaining ring or ledge 4 a short distance from the end of the cylindrical member 2. The opposite end 5 of the member 2 is closed except for a small threaded opening 6 through which a threaded shaft 7 passes.

A rectangularly shaped member 8 open on two sides is carried on the inner end of the shaft 7 within the cylindrical housing 2 in such manner that the shaft 7 can rotate freely through an opening 9 in the one end of the rectangular member 8. A retaining collar 10 is provided on the end of the shaft 7 and is of a diameter sufficiently large that it will not pass through the opening 9. The end of the member 8 opposite the end through which the shaft 7 passes is provided with an opening 11 which is large enough to accommodate the end of the axle of an automobile. FIGURE 2 shows the axle 12 in position through the opening 11 with the nut 13 in threaded engagement with the end of the axle. The member 8 is open on two sides for ease of access for putting the nut on the end of the axle. The cylindrical member 2 has a substantial cutaway portion 14 in the one side thereof for ease in manipulation of the device when placing the nut, etc. on the end of the axle.

A separate circular piece 15 provided with a U-shaped recess 16 of a size sufficiently large to fit over the axle 12 fits within the opening at the end 3 of the cylindrical member 2 against the retaining ring 4. The circular member 15 can also be placed inside the cylindrical member 2 in engagement with the inner surface 17 of the retaining ring 4 as shown in FIGURE 3. The cut-outs 18 are provided in the cylindrical member 2 for ease in inserting and withdrawing the circular member 15.

The outer end of the shaft 7 is provided with a hexagonal area 19 for engagement by a wrench or other suitable torque applying device.

The end of the shaft 7 positioned within the rectangular member 8 is provided with a recess 20 to accommodate a pin 21 as shown in FIGURE 3. The purpose of this pin 21 is to exert force on the end of the axle to remove the bearing from the axle as shown in FIGURE 3.

In the operation of this device for the removal of the axle from a car, the cylindrical member 2 is placed in position with the end 3 in engagement with the brake disc or dust shield in such manner that the threaded end of the axle projects through the opening 22 in the retaining ring 4. The shaft 7 is screwed in to the extent necessary to place the opening 11 of the rectangular member 8 in close proximity to the retaining ring 4 so that the threaded end of the axle 12 will extend through the opening 11 a sufficient distance so that the nut can be placed on the end of the axle as shown in FIGURE 2. When the parts are in this position rotative force is applied to the hexagonal end 19 of the shaft 7 to draw the shaft 7 from left to right as shown in FIGURE 2. Due to the fact that the end 3 is in engagement with the brake disc or dust shield, this causes the axle to be withdrawn from the housing with the bearing 23 still in position on the axle. The shaft 7 is rotated until the bearing 23 has been drawn through the opening 4 and is clearly inside the cylinder 2 a sufficient distance to insert the circular member 15 between the bearing 23 and the inner surface 17 of the ring 4. When the parts are in this position the pin 21 is inserted in the recess 20 and the shaft 7 is rotated in the opposite direction to screw it into the opening 6 to exert pressure on the end of the axle. This action pushes the axle through the bearing which is retained by the circular member 15 in engagement with the surface 17 of the ring 4.

The new bearing is placed on the axle by placing the circular member 15 in position in the end of the cylindrical housing 2 in engagement with the outer surface of the retaining ring 4 so that the bearing engages the outer surface of the circular member 15 which is slipped over the axle by reason of the opening 16 in the circular member 15. Further movement of the screw threaded shaft 7 from left to right as shown in FIGURE 2 will withdraw the axle 12 into the bearing 23.

After the new bearing is in position on the axle 12, the shaft 7 is moved from left to right a short distance to relieve the pressure on the circular member 15 so that it can be withdrawn from engagement with the ring 4. After the circular member 15 is withdrawn, the axle 12 can be guided into the housing until the surface 3 engages the brake disc or dust shield at the end of the housing.

Continued rotary motion on the shaft 7 movnig it from right to left as shown in FIGURE 3 pushes the axle 12 into its position within the housing.

It will be clear from the foregoing that I have developed a device which will remove the axle from an automobile and will make it possible to replace the bearing carried on the axle.

I claim:

1. An axle puller, the elements comprising a housing to engage the dust shield surrounding the axle of an automobile, an opening in the end of said housing to receive the end of the axle to be removed, a screw-threaded shaft in threaded engagement with the other end of said support in alignment with the axle to be removed, a rectangular yoke positioned within the housing and carried by the end of the screw threaded shaft, said yoke being alignment with the axle and having an opening at the end opposite the end of the screw threaded shaft to receive the end of the axle, and means to restrict the size of the opening in the end of said housing through which the axle moves to prevent the passage of a bearing carried on the axle from passing through the opening.

2. An axle puller, the elements comprising a housing to engage the dust shield surrounding the axle of an automobile, an opening in the end of said housing to receive the end of the axle, a screw threaded shaft in threaded engagement with the other end of said support in alignment with the axle to be removed, a rectangular yoke positioned within the housing and carried by the end of the screw threaded shaft, said yoke being in alignment with the axle and having an opening at the end opposite the end of the screw threaded shaft to receive the end of the axle, and means positioned between said screw threaded shaft and said axle within said yoke to exert pushing force on the axle when said shaft is rotated in one direction.

References Cited by the Examiner

UNITED STATES PATENTS

| 1,403,893 | 1/22 | Carter et al. | 29—263 |
| 1,446,102 | 2/23 | Oldershaw | 29—260 |
| 1,525,274 | 2/25 | Day | 29—263 |
| 2,288,906 | 7/42 | Kaplan | 29—260 |

FOREIGN PATENTS

| 643,052 | 9/28 | France. |
| 816,103 | 4/37 | France. |
| 967,424 | 11/50 | France. |
| 849,053 | 9/52 | Germany. |

WILLIAM FELDMAN, *Primary Examiner.*

NEDWIN BERGER, *Examiner.*